Oct. 26, 1965     W. L. LIVINGSTON     3,214,039

VEHICLE CONTROL SYSTEM

Filed March 12, 1963     6 Sheets-Sheet 1

FIG. IA

INVENTOR.
W. L. LIVINGSTON
BY
HIS ATTORNEY

Oct. 26, 1965    W. L. LIVINGSTON    3,214,039
VEHICLE CONTROL SYSTEM
Filed March 12, 1963    6 Sheets-Sheet 5

INVENTOR.
W. L. LIVINGSTON
BY
HIS ATTORNEY

Oct. 26, 1965 W. L. LIVINGSTON 3,214,039
VEHICLE CONTROL SYSTEM
Filed March 12, 1963 6 Sheets-Sheet 6

INVENTOR.
W.L.LIVINGSTON
BY
HIS ATTORNEY

United States Patent Office 3,214,039
Patented Oct. 26, 1965

3,214,039
VEHICLE CONTROL SYSTEM
Waltrus L. Livingston, Rochester, N.Y., assignor to General Signal Corporation, Rochester, N.Y., a corporation of New York
Filed Mar. 12, 1963, Ser. No. 264,514
25 Claims. (Cl. 214—64)

This invention generally relates to vehicle control systems and more particularly pertains to a system for accurately spotting or positioning successive vehicles at a predetermined wayside location.

Although the system of the present invention has utility wherever it is desirable to accurately stop successive vehicles at a predetermined wayside location, it has particular utility during control of unmanned vehicles, for causing the cars of an automated railway train, for example, to be successively and accurately spotted at a predetermined wayside location, such as at a mine dumping location where each car of the train is to be spotted for dumping.

More specifically, during such railway mining operation, the cars of the unmanned dump train are loaded at the mine loading location and the dump train is then controlled, for example, in accordance with command information communicated from the wayside of the vehicle, to travel towards the mine dumping location where the individual cars of the train are to be successively spotted for car dumping.

In accordance with the present invention, it is proposed to then completely automate the subsequent car dumping operation, whereby each successive car in the train is accurately and automatically spotted and dumped without requiring manual intervention, on the part of an operator, except possibly to utilize such operator, if desired, to control the entrance of the automated train into the dumping area.

For example, in the illustrated embodiment shown herein, after the operator has determined that the automated train may proceed into the dumping area, he depresses a push button which causes the proper proceed command information to be communicated to the awaiting vehicle, permitting it to enter the dumping area. Thereafter, the operator becomes a mere observer; i.e., he is not required to perform any subsequent control over the train being dumped, and can therefore devote himself to other duties.

More particularly, when the first dump car of the automated train reaches a predetermined location in advance of the desired stopping location adjacent the dumper, a timing device is automatically set in operation to time out a preselected time interval, at the end of which the proceed command is interrupted so as to initiate the stopping of the automated train.

If the first dump car stops properly at the desired location for dumping, the car is then automatically dumped, and afterwards, the proceed command is then once again automatically communicated to the vehicle so as to bring the next dump car towards the dumping location. However, if the first dump car should initially overrun or stop short of the desired stopping location, the proper command information is automatically communicated to the unmanned train for causing it to operate, as necessary, to properly respot the dump car at the desired spotting location, after which the car is then dumped.

More particularly, means are provided in accordance with the present invention to register the actual stopping position of each car in the automated dump train relative to the desired spotting location, and, to automatically communicate train control information from the wayside to the vehicle in response to this registration as necessary to cause the car to be moved to the desired spotting location, in the event that the train should stop with the car to be dumped misaligned with the desired spotting location. After the car has been correctly spotted, that car is then automatically dumped and subsequently, the automated train is then moved forward to bring the next successive car up to the dumping location.

It has been observed during the stopping of such dump cars, that because of weather conditions, train loading, etc., the stopping distance associated with the individual cars may furthermore vary from time to time and thus tend to have each of the cars stop either long or short relative to the desired stopping location. Obviously, if such improper stopping were allowed to continue, the actual stopping point for the cars may gradually fall out of alignment with the desired stopping location; e.g., if the actual stopping distance for each car is somewhat less than the expected stopping distance, a point may be reached where a subsequent car stops too short of the desired stopping point and therefore would require respotting before the car could be dumped.

In order to minimize the possibility of such gradual falling out of alignment of the stopping cars, provision is made in accordance with the present invention whereby the actual stopping location of each car is utilized to automatically adjust the stopping pattern for the subsequent car; e.g. if one car overruns the desired stopping location, the stopping pattern for the subsequent car is adjusted by decreasing the above-mentioned time interval, for example, to cause sooner interruption of the proceed command communicated to the train during movement of this subsequent car towards the dumping location, and thereby preventing the subsequent car from also overrunning the desired stopping location. In this manner, the system is readily brought back into alignment so that each car stops properly at the desired stopping location.

In view of the above, one object of the present invention is to provide for accurately spotting successive vehicles at a predetermined location.

A further object of the present invention is to provide a system for controlling the successive spotting of automated vehicles at a predetermined location in accordance with command signals communicated to said vehicles.

Another object of the present invention is to provide a registration of the actual stopping location of a vehicle relative to a predetermined desired stopping location and to automatically control such vehicle in response to said registration, as required to move the vehicle to the desired stopping location.

A more specific object of the present invention is to provide for accurately spotting and dumping each successive car in an automated railway dump train at a predetermined wayside dumping location.

A still further object of the present invention is to provide a registration of the actual stopping location of a vehicle relative to a predetermined desired stopping location and to adjust the stopping pattern for a subsequent vehicle in accordance with said registration.

Other objects, purposes and characteristic features of the present invention will be in part pointed out as the description of the invention progresses and in part obvious from the accompanying drawings, in which:

In order to simplify the illustration of the drawings and facilitate in the explanation of the fundamental characteristics of the invention, various parts and circuits have been shown diagrammatically in accordance with conventional symbols. Thus, arrows with associated symbols (+) and (—) are employed to indicate connections of the various relay circuits, in the illustrated embodiment, to opposite terminals of a suitable source of current for energization of such relays.

Figure 1A:
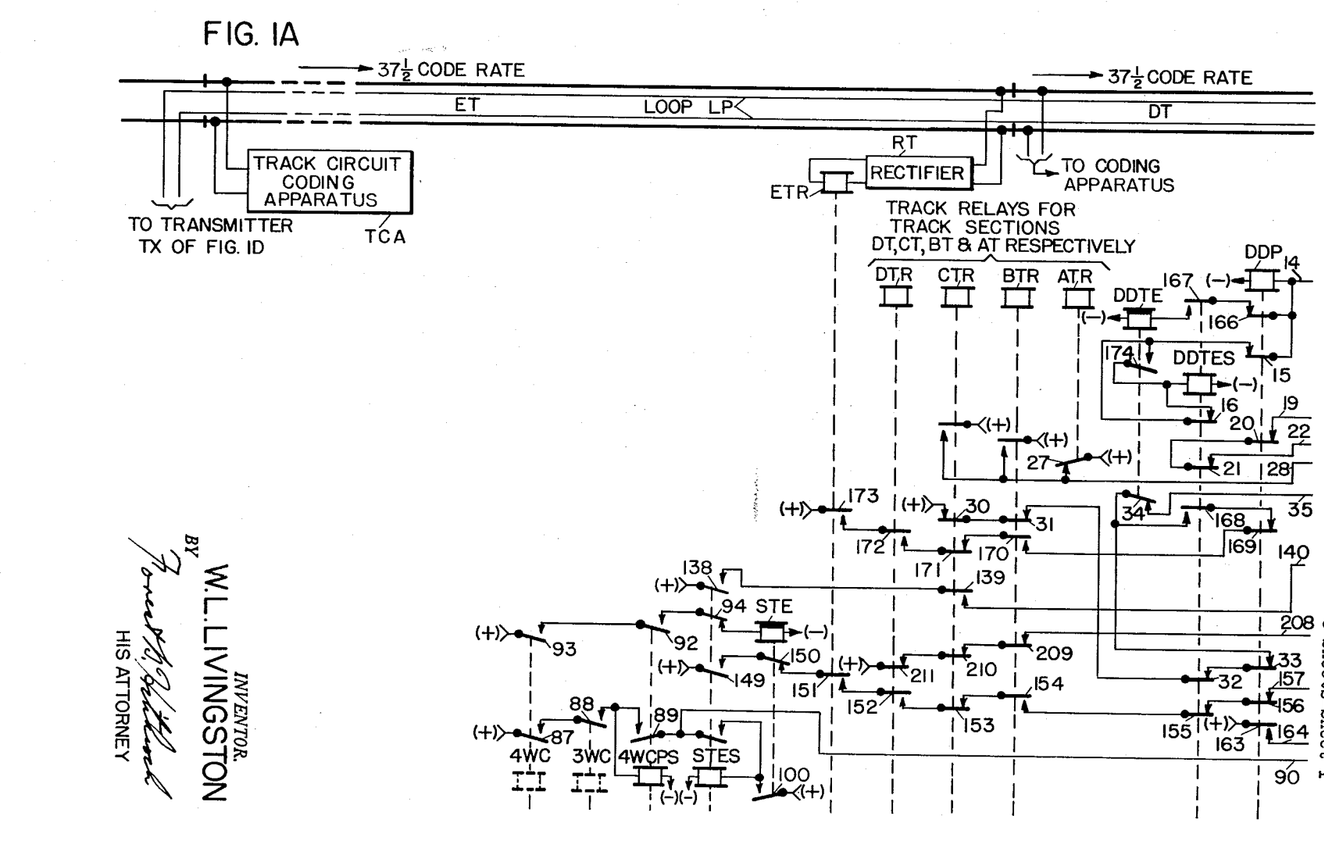
FIGS. 1A through 1D illustrate a track layout and the wayside apparatus in accordance with one embodiment of the present invention for accurately spotting and dumping the cars of an automated railway dump train.
Figure 1B:
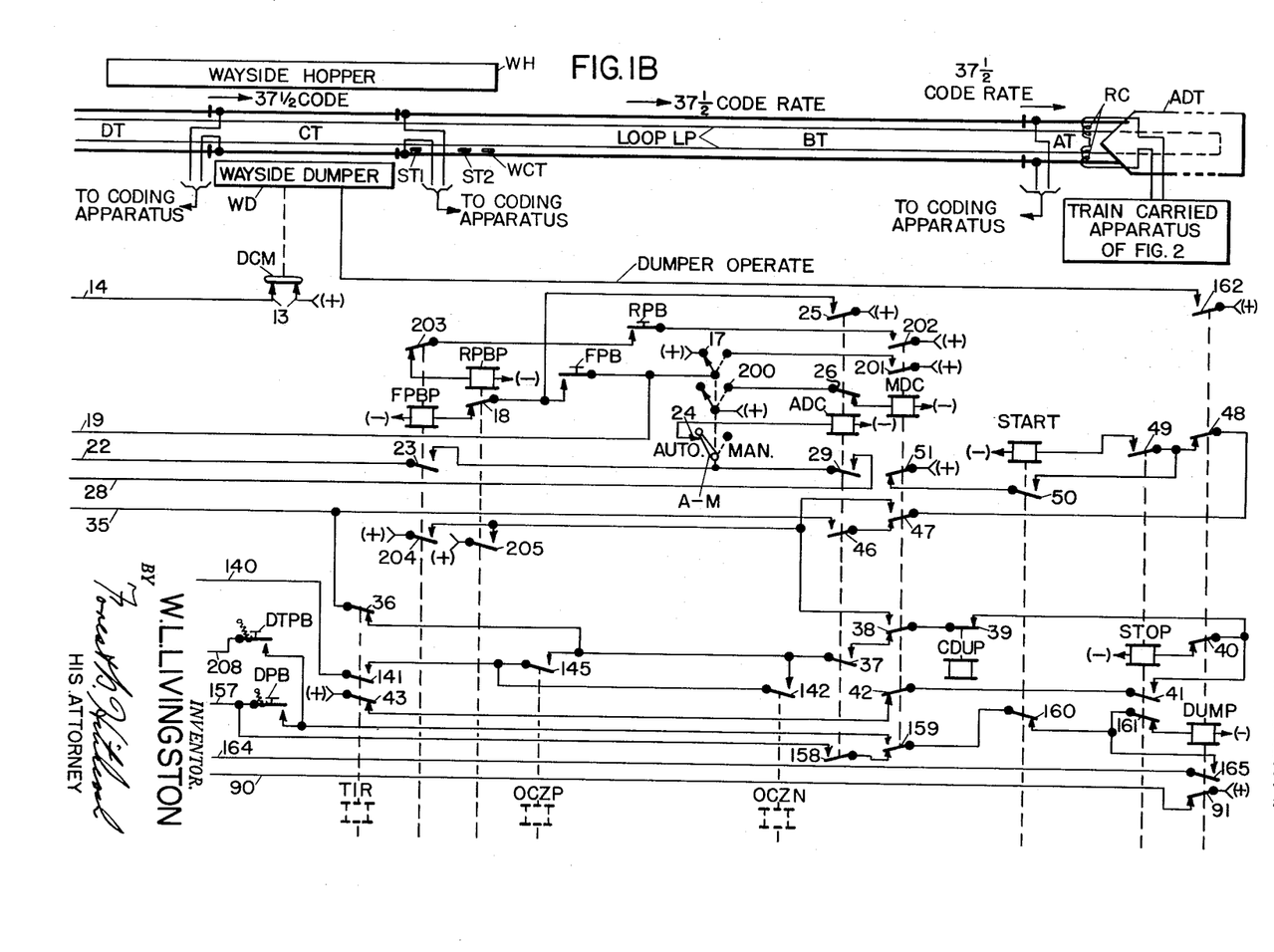

With more particular reference to FIGS. 1A and 1B, a stretch of railway track is illustrated, including track sections AT, BT, CT, DT and ET, which extends through a wayside dumping location including wayside dumper WD and wayside hopper WH of FIG. 1B. More specifically, the track section CT is centered at the wayside dumping location and has a length which is slightly smaller than the distance between the wheel trucks on the dumper cars assumed to be utilized in this illustrated embodiment. Thus, when the track section CT is unoccupied and the wheels of the spanning car are on track sections DT and BT respectively, the car is in proper position for dumping into the wayside hopper WH. A typical wayside dumper for use with this apparatus is shown and described in the motion picture entitled "The First Automatic Railway," available for showing on request from the instant assignee.

In accordance with the illustrated embodiment of this invention, the track sections AT, BT, CT, DT and ET of FIGS. 1A and 1B are assumed here to be normally coded at a 37½ code rate by suitable track circuit coding apparatus well known to those skilled in the art. With more particular reference to FIG. 1A, the track circuit coding apparatus TCA associated with track section ET is shown in block form and is connected to the left-hand end of track section ET so as to energize the rails of section ET at a 37½ code rate; i.e., the 37½ code rate is transmitted through the rails of track section ET from left to right as shown in FIG. 1A. Without attempting to limit the scope of the present invention, this 37½ code rate might be formed, for example, by intermittently interrupting a base frequency of perhaps one hundred cycles per second to produce thirty-seven and one-half pulses per minute for application to the track rails. Connected across the right hand end of track section ET is a suitable rectifier apparatus RT which converts the code rate applied to the rails of track section ET into suitable direct current to cause track relay ETR to be picked up as long as the track section ET is unoccupied.

Similarly, the left-hand ends of the remaining track sections DT, CT, BT and AT are also normally coded at a 37½ code rate by suitable track coding apparatus (not shown) similar to that used at the left-hand end of track section ET, and, the associated track relays DTR, CTR, BTR and ATR in FIG. 1A are each picked up (as shown) when the associated track section is unoccupied and dropped away when the associated track section becomes occupied.

With reference to FIG. 1B, a plurality of wheel actuated treadles ST1, ST2 and WCT are located along the trackway just to the right of track section CT, for purposes to be described, and are thus actuated as each car approaches the desired stopping location at the center of the wayside dumping location. Accordingly, the normal traffic direction on the illustrated stretch of track is from right to left in the accompanying drawings.

A loop circuit LP is mounted between the rails of the illustrated stretch of track and is utilized to communicate certain train control information from the wayside to the automated dump train being controlled in accordance with the present invention, for causing such vehicle to operate as necessary to accurately spot each successive car of the automated train at the wayside dumping location of FIG. 1B. More particularly, as seen best in FIG. 1D, the loop circuit LP is supplied with a tone modulated carrier frequency by the transmitter TX of FIG. 1D. This transmitter TX is supplied with the carrier frequency generated by carrier oscillator COSC which might be, for example, a one kilocycle signal which is then modulated by various combinations of the tones T4, T5, T6 and TV as produced by the tone generators T4G, T5G, T6G and TVG respectively, of FIG. 1D, dependent upon the desired automatic operation of the unmanned railway vehicle. The particular tone modulations associated with each automatic vehicle operation will be described in detail hereinafter.

Figure 2:
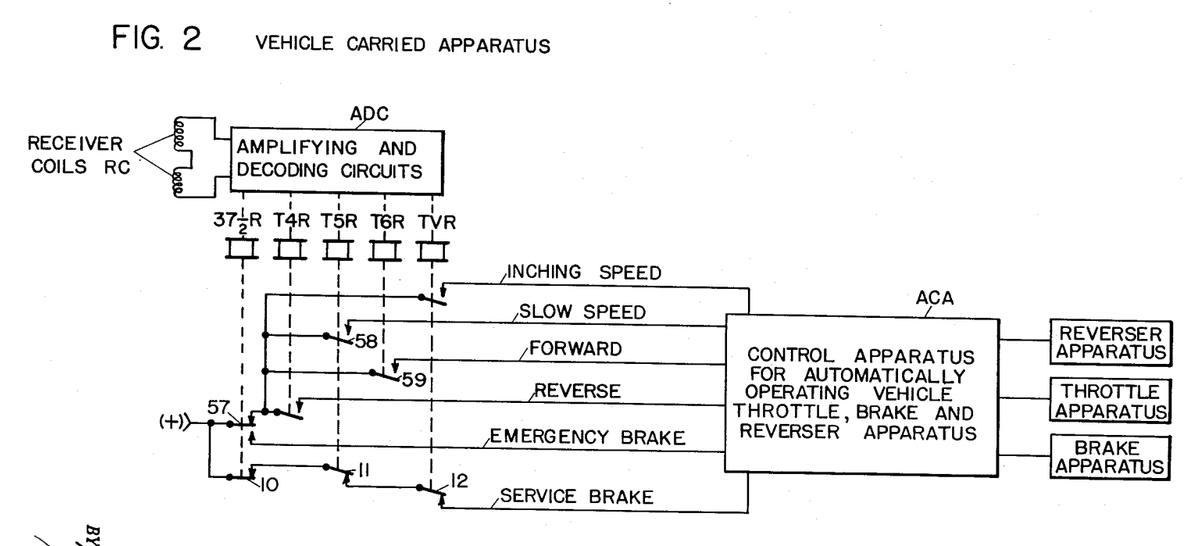
FIG. 2 illustrates partially in block form certain vehicle carried apparatus in accordance with the same embodiment of the present invention.

With reference to FIG. 2, the automated vehicle assumed as being controlled in accordance with the illustrated embodiment of the present invention is equipped with throttle, brake and reversing apparatus automatically operated in accordance with the command information communicated from the wayside to the vehicle over the track rails and loop circuit LP. More particularly, suitable receiver coils RC are mounted on the head end of the train to inductively receive both the track code rate and the tone modulated carrier frequency applied to the wayside loop circuit LP. This received command information is then amplified and decoded by suitable apparatus ADC which causes the decoding relays 37½R, T4R, T5R, T6R and TVR of FIG. 2 to be selectively energized for registering the desired operation of the automated train. In accordance with the registration of these train carried decoding relays, the throttle, brake and reversing apparatus of the unmanned train is then automatically operated by suitable control apparatus ACA, to cause the train to operate as called for from the wayside.

Without attempting to limit the scope of the present invention, the following tabulation represents various command information communicated to the vehicle, in accordance with the illustrated embodiment, and the corresponding automatic train operation associated therewith.

Transmitted control:    Automatic train operation
    No code __________ Emergency brake application.
    37½ code rate only _ Service brake application.
    37½ code rate plus
        tones T6 and T5 _. Forward travel at slow speed.
    37½ code rate plus
        tones T4 and T5 _. Reverse travel at slow speed.
    37½ code rate plus
        tones T6 and TV _Forward travel at inching speed.
    37½ code rate plus
        tones T4 and TV _ Reverse travel at inching speed.

In the above, it will be noted that slow and inching speeds are referred to. Thus, in the illustrated embodiment, it is assumed that the slow speed might be, for example, two miles per hour as the normal train speed upon the illustrated stretch of track; while, the inching speed might be variable between one-eighth and three-eighths of a mile per hour, for example, for use in spotting cars which overrun or stop short of the desired stopping location.

As mentioned previously, when dumping operations are to begin, the operator depresses a push button and a proceed command is then automatically communicated to the awaiting dump train which causes the train to proceed into the dumping area of FIG. 1B, for example, at two miles per hour. However, when the first dump car of the automated train passes a predetermined location in advance of the desired stopping point at the wayside dumping site, a timing organization is started which times out a preselected time interval, at the end of which the proceed command is interrupted to initiate stopping the automated train.

Figure 1C:
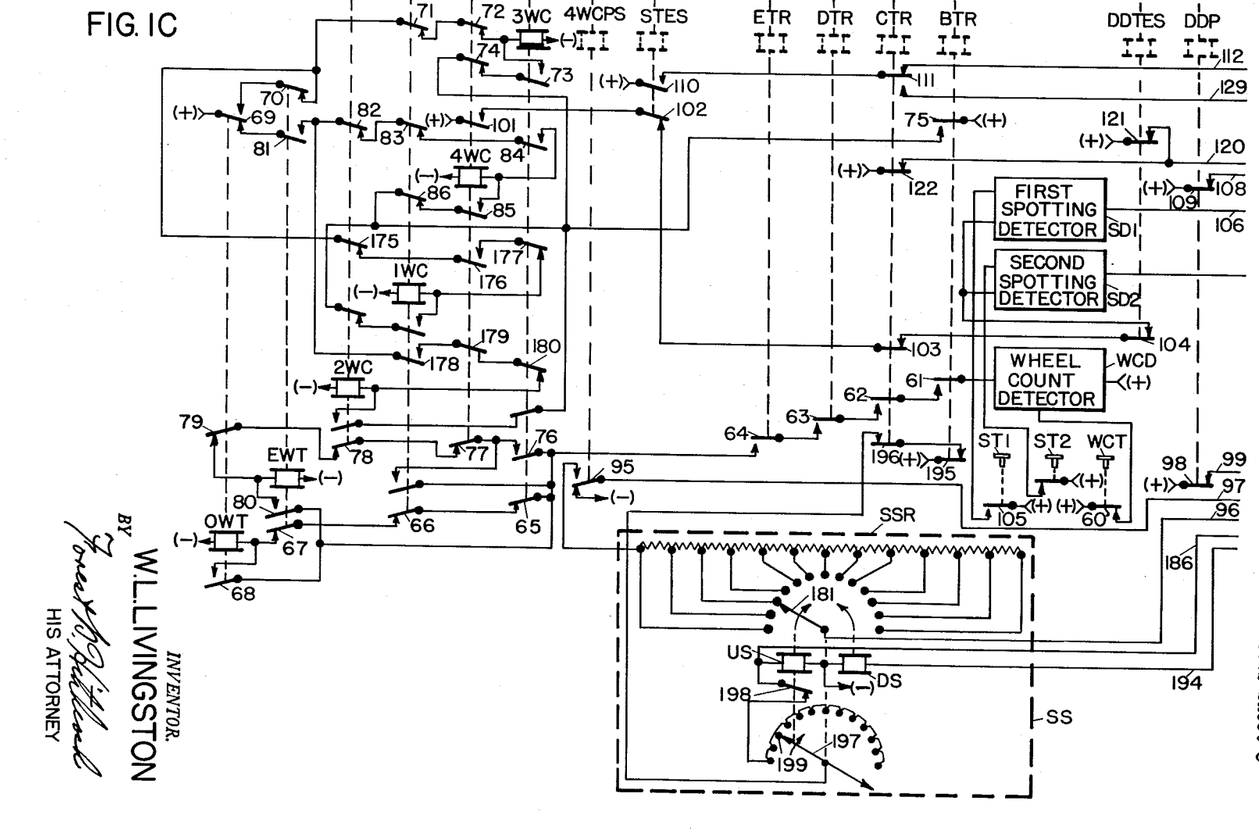
Figure 3:
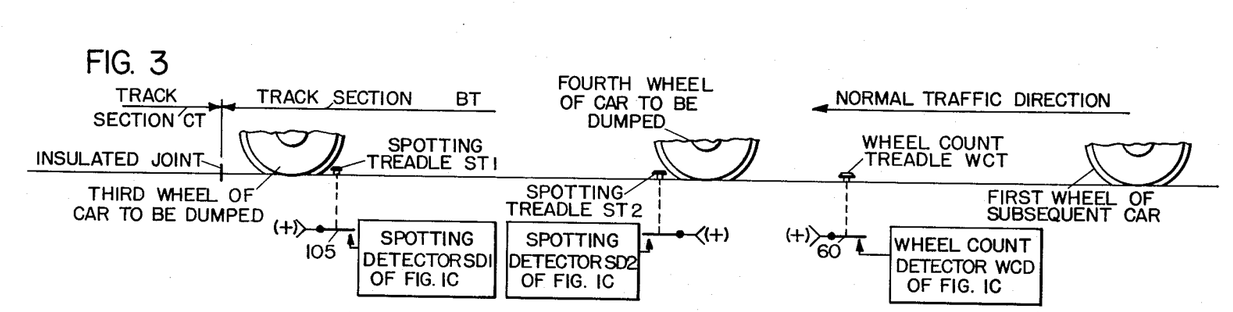
FIG. 3 illustrates in somewhat more detail a certain portion of the wayside apparatus illustrated in FIGS. 1A through 1D.

More specifically, suitable wheel counting apparatus is provided in the illustrated embodiment including count treadle WCT, shown in FIGS. 1B and 3, wheel count detector WCD of FIG. 1C and relays OWT, EWT, 1WC, 2WC, 3WC and 4WC also of FIG. 1C which count the wheels on one side of each dump car. With reference to FIG. 1C, although the wheel count detector WCD is illustrated in block form, it is assumed here to be of any suitable type of apparatus capable of supplying an output energy pulse each time treadle WCT is actuated. In the illustrated embodiment of the present invention, it is furthermore assumed that each of the cars on the automated dump train is similar in construction and is provided with a wheel truck at its respective ends each carrying a pair of axles; i.e., each of the dump cars has four axles.

Accordingly, the relays 1WC through 4WC as seen in FIG. 1C are utilized to register the passage, at treadle WCT, of the four wheels on one side of a car approaching the wayside dumping location so that a wayside timer TIM (see FIG. 1D) can then be initiated. After the timer TIM has timed out a preselected time interval, relay TIR is picked up causing the proceed command being communicated to the vehicle, via loop circuit LP, to be interrupted and a service brake application then results for bringing the train to a stop. By properly selecting the above-mentioned time interval, it is intended that the train will come to a stop with the car to be dumped properly positioned at the dumping site.

Although the foregoing discussion has dealt only with cars having four axles, it should be obvious that the system of the present invention could also readily be adapted to handle different length cars with either four or six axles without in any manner departing from the spirit or scope of the present invention.

Figure 1D:
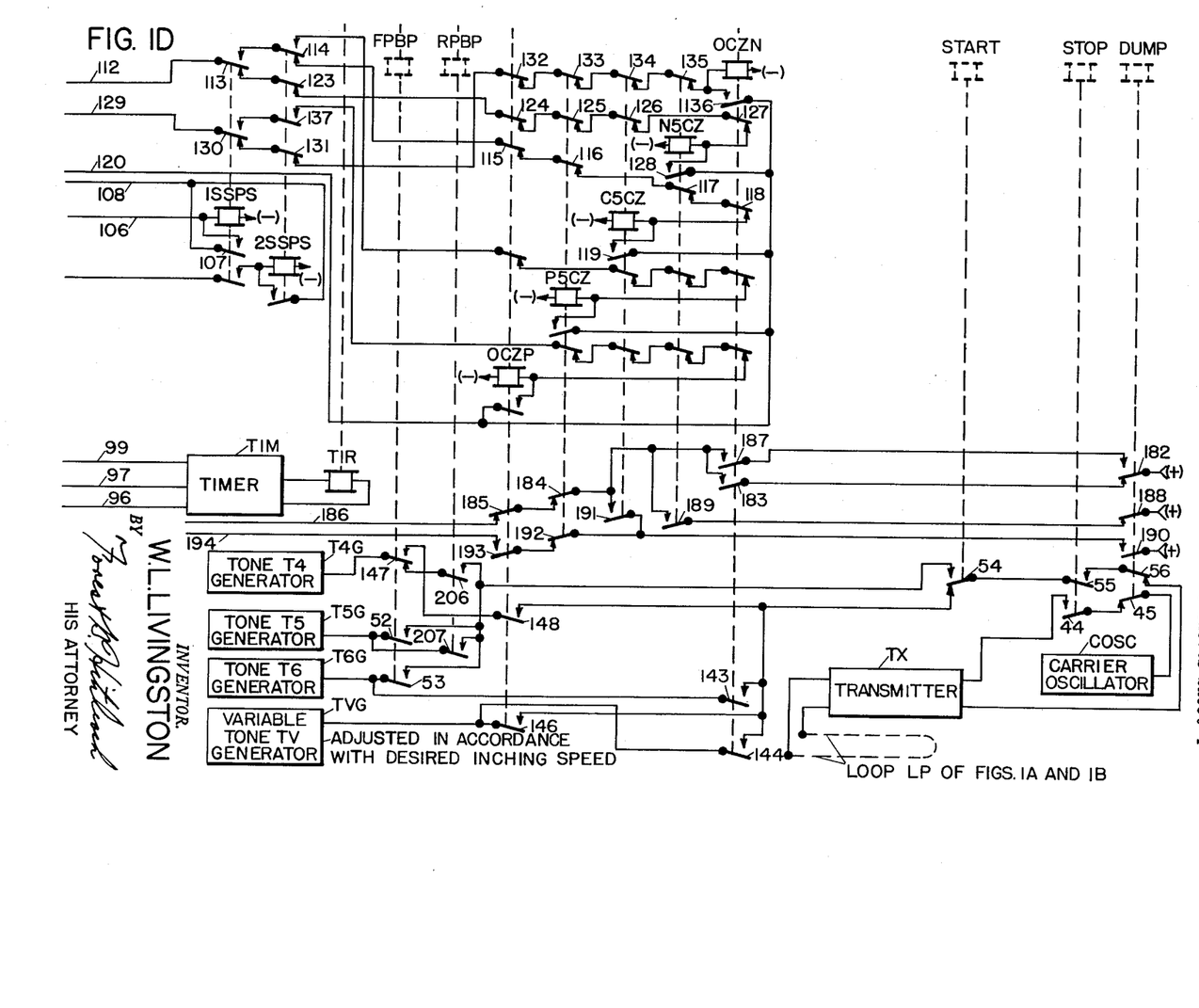

After the automated train stops in response to the above-mentioned stop control, the actual stopping location of the car to be dumped relative to the desired stopping location is automatically registered on spotting register relays OCZN, N5CZ, C5CZ, P5CZ, and OCZP of FIG. 1D. More specifically, the registration of this group of spotting register relays OCZN, N5CZ, etc. is controlled, as will be poined out in detail hereinafter, by spotting detectors SD1 and SD2 of FIG. 1C and the associated relays 1SSPS and 2SSPS of FIG. 1D, in accordance with the selective actuation of spotting treadles ST1 and ST2 shown in FIGS. 1B and 3.

The registration of this group of spotting register relays illustrated in FIG. 1D is then utilized to cause the proper command signals to be automatically communicated from the wayside to the vehicle, as necessary to move the car to the correct spotting position (spanning track section CT), if it initially stops either too long or too short relative to the desired stopping location.

The registration provided by this group of spotting register relays is furthermore utilized to adjust the timer TIM of FIG. 1D so as to prevent the actual stopping location of the cars from gradually falling out of alignment relative to the desired stopping location. More particularly, the interval timed by timer TIM, as discussed above, is dependent upon the setting of variable resistor SSR in stepper switch SS (see FIG. 1C), in such a manner that as more and more resistance is connected to the timer TIM, as will be described, the interval timed out by timer TIM increases. Therefore, by increasing the effective value of resistor SSR when a car stops short, the subsequent car would be permitted to receive the proceed command for a somewhat longer period of time, after passing the wheel count treadle WCT, before the above-mentioned stop control is communicated to the vehicle, and thus, would correctly stop further along the trackway than did the previous car.

With reference to FIG. 1C, the particular setting of resistor SSR is controlled in accordance with the actuation of up and down-step relays US and DS, respectively, which in turn are energized in response to the spotting registration provided by the relays OCZN, N5CZ, C5CZ, P5CZ and OCZP of FIG. 1D. Thus, if the spotting registration provided by relays OCZN, N5CZ, etc., indicates that a car has stopped short, the up-step relay US is selectively energized to increase the setting of resistor SSR; whereas, if a car overruns the desired stopping position, relay DS is operated to decrease the effective value of resistor SSR. In this manner, the interval timed by timer TIM is automatically increased or decreased in accordance with the manner in which the actual stopping location of the previous car varies relative to the desired spotting location.

Means are provided in the illustrated embodiment whereby the automated vehicle can be either automatically or manually controlled during the spotting and dumping of the cars at the wayside dumping location. More particularly, the switch A–M of FIG. 1B, is provided for selecting between manual and automatic operation. While in the automatic position (as shown), the unmanned vehicle is automatically stopped, started and spotted by the illustrated circuit apparatus; whereas, in the opposite or manual position, a dumping operator manually selects how the vehicle is to be operated for correct spotting and dumping of the cars at the wayside dumping location.

As previously mentioned, the wayside dumper WD of FIG. 1B is automatically controlled, in accordance with the illustrated embodiment of the present invention, to dump each car of the automated dump train after that car is properly spotted. More particularly, the wayside dumper WD is assumed here to be that type which is normally in a non-dumping position and which is automatically operated to a reverse or dumping position and then back again to the normal position when the relay DUMP of FIG. 1B is picked up, as will be described. In the illustrated embodiment of the present invention, it is also assumed that when the dumper WD is operated to its reverse or dumping position, it tilts the body of the car then spotted at the hopper WH, so as to dump the contents of that car in the hopper; and, when the dumper returns to its normal position, the body of the car automatically is restored to its untilted position. In addition, the position of the wayside dumper WD is registered by relays DDP, DDTE and DDTES of FIG. 1A, for purposes to be described hereinafter.

Furthermore, the wayside hopper WH is assumed to be that type wherein a crusher mechanism is provided to grind up whatever ore is being dumped into the wayside hopper from the dump cars of the automated vehicle. This crusher is also assumed here to be provided with doors, and the relay CDUP of FIG. 1B is then utilized to check on the position of the crusher doors so that it is picked up (as shown) only when the wayside hopper is in proper condition to receive the ore from the automated dumper train.

TRACK LAYOUT

As previously mentioned, the stretch of track illustrated in FIGS. 1A and 1B includes track sections AT, BT, CT, DT and ET, of which, track section CT (see FIG. 1B) is centered at the wayside dumping location and has a length which is slightly less than the distance between the wheel trucks on the dumper cars utilized in the illustrated embodiment of the present invention; i.e., assuming the dump cars each have four axles, the track section CT is spanned when a car is in proper dumping position with the second set of wheels (i.e., second axle) of the car shunting track section DT (to the left of track section CT) and the third wheels of the car shunting track section BT (to the right of track section CT). In addition, the track sections BT, DT and ET are so situated and of such length that they are shunted by the automated dump train as long as the car dumping operations are taking place; i.e., even though track section CT is unoccupied when a car is spotted properly.

The various wheel actuated treadles shown in FIGS. 1B and 3 are located at specific predetermined points to the right of track section CT (see FIG. 1B), so as to provide proper indication concerning the position of the various wheels of the dumper cars. More specifically, spotting treadle ST1 is spaced from the right-hand end of track section CT by an amount selected in accordance with the required practical limits of the optimum spotting position for each dump car at the wayside dumping location; i.e. as more and more accurate spotting is required, the treadle ST1 would be moved closer and closer to the right-hand end of track section CT; whereas, if very accurate spotting is not required, the treadle ST1 could be moved somewhat farther away from the track section CT. The other spotting treadle ST2 is then spaced from treadle ST1 by a distance which is just shorter than the distance between axles on the same wheel truck; e.g., between the third and fourth wheels of the four-axle dump cars assumed in the illustrated embodiment.

The length of track section DT and position of wheel count treadle WCT are furthermore selected so that the third set of wheels on the first dump car behind the locomotive is approaching the treadle WCT of FIG. 1B when the locomotive first enters track section ET of FIG. 1A so as to drop track relay ETR, and, the location of the wheel count treadle WCT is also selected so that the treadle is in position to be first actuated by the front or first wheels of each subsequent car after the preceding car has been correctly spotted at the wayside dumping location; i.e. spanning track section CT.

Although the illustrated embodiment of the present invention utilizes wheel-actuated treadles to detect the position of the wheels on the dump cars, as generally discussed above, it should be obvious that such treadles may be replaced, if desired, by various other types of detecting devices, such as for example, photocells or the like, without in any manner departing from the spirit or scope of the present invention.

NORMAL CONDITIONS

Before discussing, in detail, the operation of the illustrated system embodying the present invention, it is first deemed necessary to set forth the normal operating conditions of the system, when ready to accept an unmanned dump train.

More specifically, it will now be assumed that a loaded unmanned dump train ADT is standing on the track section AT in FIG. 1B, with a service brake application in force on the vehicle due to the reception of the 37½ track code rate by the train carried receiver coils RC; i.e., with more particular reference to FIG. 2, the reception of the 37½ code rate causes the SERVICE BRAKE control wire of FIG. 2 to be energized over front contact 10 of relay 37½R and back contact 11 and 12 of relays T5R and TVR respectively. Furthermore, with the train standing on approach track section AT, the associated track relay ATR of FIG. 1A is dropped away while the remaining track sections BTR, CTR, DTR and ETR associated with the remaining track sections BT through ET are in their illustrated picked up positions.

It will also be noted that the wayside dumper WD is in its normal or non-dumping position wherein indicator contacts 13 of FIG. 1B are closed, by contact member DCM, to cause dumper repeater relay DDP of FIG. 1A to be energized over wire 14. Furthermore, with the dumper WD in its normal or non-dumping position, relay DDTES of FIG. 1A is also normally energized from wire 14 over front contact 15 of relay DDP and its own front contact 16. The manner by which the stick circuit is provided for relay DDTES will be described in detail hereinafter.

*Operation*

Assuming that the switch A–M of FIG. 1B is in its illustrated left-hand or automation position AUTO, it will now be assumed that the dumper operator wishes to permit the unmanned train ADT standing on track section AT to proceed into the dumping area for automatic dumping of the loaded cars of the train.

The operator thus depresses push button FPB in FIG. 1B and causes relay FPBP to be subsequently energized by a circuit including left-hand contact 17 of switch A–M, the closed contact of push button FPB and back contact 18 of relay RPBP. This picking up of relay FPBP then causes pick up of the automation relay ADC by a circuit extending from (+) in FIG. 1B, through contact 17 of switch A–M, wire 19 between FIGS. 1B and 1A, front contacts 20 and 21 of relays DDP and DDTES respectively, wire 22 between FIGS. 1A and 1B, front contact 23 of relay FPBP, contact 24 of switch A–M, and to (−). When the relay ADC picks up, the relay FPBP is then provided with a holding circuit including front contact 25 of relay ADC; whereby relay FPBP is maintained in a picked up position even though push button FPB is subsequently released.

This picking up of relay ADC furthermore opens its back contact 26 to prevent pick up of the manual relay MDC, and furthermore, completes a stick circuit for itself extending from (+) in FIG. 1A, through back contact 27 of relay ATR, wire 28 between FIGS. 1A and 1B, front contact 29 of relay ADC, contact 24 of switch A–M, and to (−). With reference to this stick circuit for relay ADC, it will be noted that the relay ADC is thus maintained in its picked up position as long as the switch A–M remains in the automation position AUTO and the automated dump train occupies one of the track sections AT, BT or CT.

In accordance with the picking up of relay ADC, relay STOP of FIG. 1B is then energized over a circuit including front contacts 30 and 31 of relays CTR and BTR respectively (in FIG. 1A), front contacts 32 and 33 of relays DDTES and DDP respectively, back contact 34 of relay DDTE, wire 35 between FIGS. 1A and 1B, back contact 36 of timer relay TIR, front contact 37 of relay ADC, back contact 38 of relay MDC, front contact 39 of relay CDUP, and back contact 40 of relay DUMP. Once the relay STOP picks up, it is thereafter retained by a stick circuit including its own front contact 41 and back contacts 42 and 43 of relays MDC and TIR respectively.

With reference to FIG. 1D, the picking up of relay STOP connects the carrier oscillator COSC to transmitter TX, over front contact 44 of relay STOP and back contact 45 of relay DUMP, and furthermore, causes pick up of relay START of FIG. 1B. More specifically, the energizing circuit for relay START extends through front contacts 30, 31, 32 and 33 of relays CTR, BTR, DDTES and DDP respectively of FIG. 1A, back contact 34 of relays DDTE, wire 35 between FIGS. 1A and 1B, front contact 46 of relay ADC, back contacts 47 and 48 of relays MDC and DUMP respectively, and front contact 49 of relay STOP. Once the relay START is picked up, it is thereafter retained in its picked up position by a stick circuit including front contact 49 of relay STOP, its own front contact 50, and back contact 51 of relay MDC.

With relay START now also picked up, tones T5 and T6 are simultaneously applied to the transmitter TX, over front contacts 52 and 53 respectively of relays FPBP, front contact 54 of relay START, front contact 55 of relay STOP, and back contact 56 of relay DUMP. In the transmitter TX, these tones then modulate the carrier frequency supplied by oscillator COSC for application to the wayside loop circuit LP of FIGS. 1A and 1B.

With reference to FIG. 2, the reception on the train of the 37½ code rate from the track rails and the tones T5 and T6 from the loop circuit LP, causes simultaneous energization of the FORWARD and SLOW SPEED control wires of FIG. 2 by circuits which include common front contact 57 of relay 37½R, and front contacts 58 and 59 of relays T5R and T6R respectively. Furthermore, the picking up of relay T5R opens its back contact 11 to de-energize the SERVICE BRAKE control wire on the vehicle. The unmanned dump train ADT now has its brakes automatically released and is subsequently caused to proceed in a left to right direction, as viewed in FIGS. 1B and 1A, at its normal slow speed assumed here, by way of example, to be two miles per hour.

As the unmanned dump train moves along the illustrated stretch of track, it successively drops track relays BTR, CTR, and ETR in that order. However, even though the various treadles ST1, ST2 and WCT of FIGS. 1B and 3 are operated as the locomotive of the dump train passes thereover, the associated spotting and wheel count detector circuits of FIGS. 1C and 1D do not respond until the loctomotive is in position to drop track relay ETR, as will be pointed out in detail hereinafter. Thus, as mentioned previously, in the illustrated embodiment of the present invention, the track section DT has been selected of sufficient length so that when the track relay ETR is first dropped away by the locomotive, the third wheels (assuming four axles on each dumper car) of the first car behind the locomotive will be the next wheels advancing toward the wheel count treadle WTC of FIG. 1B (furthermore, see FIG. 1C wherein the treadles ST1, ST2, and WCT have also been illustrated in order to simplify the drawings).

When the third wheel of the first dumper car then actuates the wheel count treadle WCT, so as to close contact 60 as seen in FIG. 1C, the wheel count detector WCD supplies a monetary output pulse of energy to pick the odd wheel trigger relay OWT over a circuit including back contacts 61, 62, 63 and 64 of track relays BTR, CTR, DTR and ETR respectively, back contacts 65 and 66 of wheel count relays 3WC and 1WC respectively, and through back contact 67 of relay EWT. Thereafter, the relay OWT is temporarily maintained in its picked up position by a stick circuit including its own front contact 68 which is connected in multiple with back contacts 65, 66 and 67 of relays 3WC, 1WC and EWT respectively, for the purpose of insuring that the relay 3WC, for example, is sufficiently energized, as will be described, to register passage of the third wheel of the car at treadle WCT. More specifically, with the odd wheel trigger relay OWT now picked up in response to the actuation of treadle WCT, wheel count relay 3WC is energized over front contact 69 of relay OWT and back contacts 70, 71 and 72 of relays EWT, 1WC and 4WC respectively, and, is thereafter maintained by a stick circuit including its own front contact 73 and back contacts 74 and 75 of relays 4WC and BTR respectively; i.e., and relay 3WC is maintained in a picked up position until the relay 4WC is picked up to register passage of the fourth car wheel at treadle WCT, as will be described in detail hereinafter.

As the fourth wheel of the first dumper car actuates the wheel count treadle WCT, the pulse then produced by the wheel count detector WCD of FIG. 1C now causes energization of the even wheel trigger relay EWT by a circuit extending through back contacts 61 through 64 of track relays BTR through ETR respectively, front contact 76 of relay 3WC, and back contacts 77, 78 and 79 of relays 4WC, 2WC and OWT respectively; the relay OWT having been previously dropped away at the termination of the pulse created by the wheel count detector WCD due to the passage of the third wheel over treadle WCT. After once being picked up, the relay EWT is then maintained in a picked up position, throughout the duration of the wheel count pulse being developed by detector WCD, over a circuit including its own front contact 80 and the back contacts 61 through 64 of relays BTR through ETR.

With the relay EWT now picked up, wheel count relays 4WC is now energized over a circuit including back contact 69 of relay OWT, front contact 81 of relay EWT, back contacts 82 and 83 of relay 2WC and 1WC respectively, and front contact 84 of relay 3WC. After once being picked up, the relay 4WC is provided with a stick circuit including its own front contact 85, back contact 86 of relay 1WC, and back contact 75 of track relay BTR.

This picking up of relay 4WC now opens the existing stick circuit for relay 3WC, at back contact 74 of relay 4WC. However, the relay 3WC is made somewhat slow releasing so that there exists a predetermined time interval during which the front contacts of relays 3WC and 4WC are simultaneously closed.

With reference to FIG. 1A, it will be noted that with realys 3WC and 4WC both momentarily picked up, the relay 4WCPS is provided with an energizing circuit including front contacts 87 and 88 of relays 4WC and 3WC respectively. After being thus picked up, the relay 4WCPS is then provided with a stick circuit including its own front contact 89, wire 90 extending between FIGS. 1A and 1B, and back contact 91 of relay DUMP. Thus, even through the wheel count relay 3WC is subsequently dropped away at the end of its predetermined slow dropaway time, the relay 4WCPS remains in its picked up position.

This picking up of relay 4WCPS causes it to close its front contact 92 for energizing the slow pick up relay STE of FIG. 1A by a circuit including front contact 93 of relay 4WC, front contact 92 of relay 4WCPS, and back contact 94 of relay STES. The picking up of relay 4WCPS furthermore causes timer TIM of FIG. 1D to be set into operation for timing out the interval preselected by the position of variable resistor SSR in the stepper switch SS of FIG. 1C; i.e., the closing of front contact 95 of relay 4WCPS connects the resistor SSR between wires 96 and 97 which extend between FIGS. 1C and 1D to the timer TIM. More particularly, while relay 4WCPS is dropped away, the timer TIM is reset over back contact 95 of relay 4WCPS by connecting wire 97 to (−), and, when relay 4WCPS picks up, as just described, the variable resistor SSR is connected to wire 97 in such a manner that the setting of resistor SSR determines the amount of time required by the timer TIM before it can pick up the associated timer relay TIR of FIG. 1D. It should be noted in FIG. 1C, that the front contact 98 of dumper repeater relay DDP must be closed to energize wire 99, before the timer TIM will operate. After this preselected interval has been timed out by timer TIM, the relay TIR is picked up to terminate the transmission of the proceed command signal now being applied to the wayside loop circuit LP (tones T5 and T6).

More specifically, as soon as the timer relay TIR picks up, the stick circuit for relay STOP of FIG. 1B is then interrupted at back contact 43 of relay TIR, so that relay STOP returns to its normal dropped away position wherein its front contact 49 is open and the relay START is also dropped away. With reference to FIG. 1D, it will be noted that with relays START and STOP now both dropped away, the transmitter TX is disconnected from both the carrier oscillator COSC and the tone generators, so that the loop circuit LP is no longer supplied with the tone modulated carrier frequency. Therefore, the automated train ADT receives the 37½ track code only at receiver coils RC which calls for a service application of the vehicle brakes, in accordance with the energization of the SERVICE BRAKE control wire of FIG. 2. In view of the above, it should be noted that the interval required by timer TIM to pick up relay TIR, as established by resistor SSR of FIG. 1C, thus determines the location in advance of the wayside dumping location at which the proceed command signal is removed from the wayside loop circuit LP and the train begins a braking application which brings it to a complete stop, preferably with the car to be dumped exactly centered at wayside hopper WH. That is, the train stopping or braking pattern employed to initially stop a car adjacent the wayside dumper is determined by the length of time that the proceed command remains on the loop circuit after the fourth axle of the car to be dumped passes the wheel count treadle WCT in FIG. 1B.

As mentioned previously, the relay STE of FIG. 1A is also energized upon pick up of relay 4WCPS. However, this relay STE is made sufficiently slow picking up so that the vehicle has time within which to come to a complete stop before the relay STE picks up to close its associated front contact 100 in FIG. 1A. More particularly, during the time that relay STE is energized, but not picked up, the first car of the automated dump train ADT is brought to a stop at or near the desired stopping location; the optimum stopping position for any car being when that car is spanning track section CT exactly at the wayside hopper WH.

DETECTION OF ACTUAL STOPPING LOCATION

In order to detect where this first dumper car of the automated train stops relative to the optimum spotting position, as illustrated in FIG. 3, the spotting detectors SD1 and SD2 of FIG. 1C respond to the respective actuations of spotting treadles ST1 and ST2, and, cause relays 1SSPS and 2SSPS to be selectively energized in accordance with the actual stopping position of the car relative to the desired stopping position.

More specifically, if the dumper car being spotted stops in the optimum position as illustrated in FIG. 3, the third wheel of that car stops just to the left of spotting treadle ST1 while the fourth wheel of the car stops just to the right of spotting treadles ST2, as viewer in FIG. 3, with the track section CT unoccupied. Thus, during the time while the car is being brought to a stop, it first spans track section CT and then actuates spotting treadle ST1 only.

With reference to FIG. 1C, as soon as track section CT is spanned by the car being spotted, an energizing circuit is completed for the spotting detectors SD1 and SD2 extending through front contact 101 of relay 4WC, back contact 102 of relay STES, and front contacts 103 and 104 of relays CTR and DDTES respectively. Subsequently, when the third wheel of the car actuates the spotting treadle ST1, the closure of contact 105 of the treadle ST1 causes relay 1SSPS of FIG. 1D to be picked up over wire 106 extending between FIGS. 1C and 1D, which relay is then retained in its picked up position over a stick circuit including its own front contact 107, wire 108 between FIGS. 1D and 1C, and front contact 109 of relay DDP.

Subsequently, after relay STE closes its front contact 100 and picks up the associated relay STES, the relay C5CZ of FIG. 1D then becomes picked up to register that the car has stopped in the optimum spotting position, by a circuit including front contact 110 of relay STES (see FIG. 1C), front contact 111 of relay CTR, wire 112 between FIGS. 1C and 1R, front contact 113 of relay 1SSPS, back contact 114 of relay 2SSPS, and back contacts 115, 116, 117 and 118 of relays OCZP, P5CZ, N5CZ and OCZN respectively. Thereafter, the relay C5CZ is maintained in its picked up position by a circuit including its own front contact 119, wire 120 extending between FIGS. 1D and 1C, and front contact 121 and 122 of relays DDTES and CTR respectively, which front contacts are connected in multiple, for purposes to be described hereinafter.

With reference to the drawings, it should be noted that once the relay STES becomes picked up, it deenergizes the slow pick up relay STE and is thereafter maintained in its picked up position by the stick circuit including its own front contact, wire 90 between FIGS. 1A and 1B and back contact 91 of relay DUMP.

On the other hand, if the car being spotted should stop a little short of the optimum spotting position, so that it fails to actuate either of the spotting treadles ST1 and ST2 (see FIG. 3), while a the same time spanning track section CT, both of the relays 1SSPS and 2SSPS of FIG. 1D will remain in their dropped away positions (as illustrated), so that when front contact 110 of relay STES closes, as previously described, relay N5CZ of FIG. 1D will then be picked up in preference to relay C5CZ. More specifically, the circuit by which relay N5CZ is picked up, to register that the car being spotted has stopped a little short of the optimum spotting position (but still spanning track section CT so that the car may be dumped, as will be described hereinafter), includes front contact 110 of relay STES, front contact 111 of track relay CTR, wire 112 between FIGS. 1C and 1D, back contacts 113 and 123 of relays 1SSPS and 2SSPS respectively, and back contacts 124, 125, 126 and 127 of relays OCZP, P5CZ and OCZN respectively. Thereafter, the relay N5CZ would be maintained in its picked up position over its front contact 128 and the multiple connected front contacts 121 and 122 of relays DDTES and CTR respectively (see FIG. 1C).

Conversely, if the first car to be spotted stops while spanning track section CT, but, has travelled far enough so that its third wheel actuates treadle ST1 and its fourth wheel actuates treadle ST2, both of the relays 1SSPS and 2SSPS of FIG. 1D would be picked up. Subsequently therefore, when relay STES picks up as previously described, relay P5CZ of FIG. 1D would then be picked up over front contacts 113 and 114 of relays 1SSPS and 2SSPS and subsequently stuck, to register that the car has slightly overrun the optimum spotting position.

Referring to FIG. 3, if the first dumper car on the automated train stops too short of the desired spotting location so that track relay CTR remains dropped away and the third wheel of the car fails to actuate spotting treadle ST1, neither of the relays 1SSPS or 2SSPS of FIG. 1D will be picked up, since the energizing circuit for the spotting detectors of FIG. 1C requires the closure of front contact 103 of relay CTR, as previously mentioned. Subsequently, when the relay STES picks up to close its front contact 110, relay OCZN of FIG. 1D is then energized by a circuit including wire 129 1SSPS and 2SSPS respectively, and back contacts 132, 133, 134 and 135 of relays OCZP, P5CZ and N5CZ respectively. This relay OCZN, after being picked up, is then provided with a stick circuit including its own front contact 136, so as to register that the dump car has stopped too short of the desired spotting location and not in proper position for dumping.

On the other hand, if the first car of the automated dump train should excessively overrun its desired stopping position, so that it momentarily bridges track section CT and then once again drops track relay CTR by the entrance of its third wheels onto the track section CT, the spotting treadles ST1 and ST2 of FIG. 3 would both be momentarily actuated during the time section CT is being spanned by the moving first dumper car. Accordingly, relays 1SSPS and 2SSPS would both be momentarily picked up by the respective spotting detectors SD1 and SD2 of FIG 1C, to detect that the first dumper car has overrun its desired stopping position. Subsequently, when the relay STES picks up to close its front contact 110 in FIG. 1C, the relay OCZP would then be energized by a circuit including front contact 110 of relay STES, back contact 111 of relay CTR, wire 129 between FIGS. 1C and 1D, and front contacts 130 and 137 of relays 1SSPS and 2SSPS respectively. Thus, the picking up of relay OCZP and the subsequent sticking of this relay, over the multiple connected front contacts 121 and 122 of relays DDTES and CTR respectively of FIG. 1C, registers that the car has gone too far relative to its desired stopping location and likewise is not in proper position for dumping.

RESPOTTING CONTROL

As previously pointed out, a car may be dumped only if it stops while spanning track section CT. Therefore, if the car to be dumped stops either too long or too short relative to the desired spotting position, as registered by relays OCZP and OCZN respectively, it must be respotted before dumping can take place. In accordance with the present invention, the respotting of an improperly positioned car is automatically performed by the inching speed control provided by the present invention.

More specifically, if relay OCZN of FIG. 1D becomes picked up, as previously set forth, to register that the car has stopped too short, the relay STOP of FIG 1B is once again picked up by a circuit which now extends from (+) in FIG. 1A, through front contact 138 of relay STES, back contact 139 of relay CTR, wire 140 between FIGS. 1A and 1B, front contact 141 of timing relay TIR, front contact 142 of relay OCZN, front contact 37 of relay ADC, back contact 38 of relay MDC, front contact 39 of relay CDUP, back contact 40 of relay DUMP, and to (−). The relay STOP, after picking up, thus reconnects the carrier oscillator COSC of FIG. 1D to the transmitter TX wherein the carrier frequency is modulated at this time by tones T6 and TV. More specifically, the circuit by which tone T6 is now applied to the transmitter TX includes back contact 56 of relay DUMP, front contact 55 of relay STOP, back contact 54 of relay START and front contact 143 of relay OCZN; whereas, the variable tone TV is now applied to transmitter TX over front contact 144 of relay OCZN.

With reference to FIG. 2, the simultaneous reception of tones T6 and TV on the automated dump train ADT causes energization of the FORWARD and INCHING SPEED control wires of FIG. 2, so that the service brake application is released and the train automatically inches forward at its nominal inching speed which might range between one-eighth and three-eights of a mile-per-hour; it being assumed here that the tone TV produced by the variable tone generator TVG of FIG. 1D is controlled, for example, by an operator at the dumping loction, in accordance with the desired inching speed which may vary within the above-mentioned range.

With the vehicle now inching forward (to the left in FIGS. 1B and 1A), as soon as the first car of the dump train straddles track section CT, the energizing circuit for relay STOP is interrupted by the opening of back contact 139 of relay CTR, at which time the relay STOP is once again dropped away to remove the modulated carrier frequency from the loop circuit LP, so that the train then receives a service brake application control in accordance with the 37½ track code rate. Since the train is travelling at a relatively very low speed, for example, at one-half of a mile-per-hour, when the stop control is received on the unmanned train (37½ track code only), the brakes are applied and the vehicle stops abruptly while spanning track section CT.

From the above discussion, it should be noted that during this respotting of the dump car, the relay START of FIG. 1D is not picked up since front contact 30 of track relay CTR (see FIG. 1A) is opened until the car clears the track section CT.

On the other hand, if the dump car being spotted had overrun the desired stopping position so as to cause spotting relay OCZP of FIG. 1D to be picked up, as previously set forth, the relay STOP would then be picked up, over front contact 145 of relay OCZP (see FIG. 1A), to cause a reverse inching control signal to be applied to wayside loop circuit LP for backing up the automated dump train ADT, from left to right in FIGS. 1A and 1B, so as to respot the car properly at the wayside hopper WH.

More specifically, the picking up of relay OCZP causes the variable tone TV to be applied to the transmitter TX over front contact 146 of relay OCZP; while the reverse tone T4 is now simultaneously applied to the transmitter TX over front contact 147 of relay FPBP and front contact 148 of relay OCZP. In accordance with this reverse inching command applied to the wayside loop circuit LP, the automated dump train ADT is then caused to travel in the reverse direction at inching speed (see FIG. 2) until the first dump car spans track section CT, at which time the reverse inching command is removed from loop LP and the vehicle brakes are applied.

DUMPING CONTROL

Figure 4A:
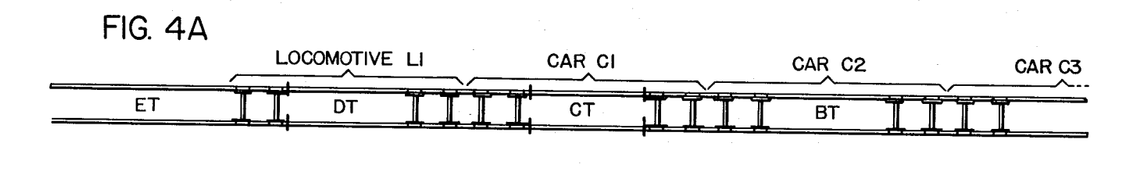
FIGS. 4A through 4C illustrate the relative positioning of the cars of the automated train with respect to the track layout during successive spotting of such cars.

After the first car to be dumped is correctly spotted over track section CT (as seen in FIG. 4A), whether such correct spotting occurs during initial train stopping or after respotting control, the relay DUMP of FIG. 1B is then energized by a circuit extending from (+) in FIG. 1A, through front contact 149 of relay STES, back contact 150 of relay STE, back contacts 151 and 152 of track relays ETR and DTR respectively, front contact 153 of track relay CTR, back contact 154 of relay BTR, front conatct 155 and 156 of relays DDTES and DDP respectively, wire 157 between FIGS. 1A and 1B, front contact 158 of relay ADC, back contact 159 of relay MDC, back contacts 160 and 161 of relays START and STOP respectively, and to (−). This picking up of relay DUMP then energizes the DUMPER OPERATE control wire of FIG. 1B, via front contact 162, so that the wayside dumper WD is now moved from its normal or non-dumping position to its reverse or dumping position wherein it automatically dumps the contents of the first car into the hopper WH.

As mentioned previously, the contacts 13 in FIG. 1B indicate the position of the wayside dumper WD in such a manner that when the dumper WD leaves its normal position, contacts 13 are no longer bridged by the contact member DCM and the relays DDP and DDTES of FIG. 1A are thus both dropped away. With the relay DDP now closing its back contact 163, a stick circuit is then provided for relay DUMP extending along wire 164 between FIGS. 1A and 1B, and through front contact 165 of relay DUMP. This sticking of relay DUMP thus maintains the DUMPER OPERATE control wire energized so that the wayside dumper WD, after having first reached its reverse or dumping position, then returns to its normal or non-dumping position wherein it again causes contacts 13 to be closed by contact member DCM. When this occurs, the relay DDP is once again energized (stick circuit of relay DUMP now interrupted) and causes subsequent picking up of its repeater relay DDTE over a circuit including front contact 166 of relay DDP and back contact 167 of relay DDTES. However, the relay DDTE is made sufficiently slow in picking up so as to provide a momentary pick up circuit for the relays START and STOP for FIG. 1B, as will be described hereinafter.

With reference to FIG. 1B, the picking up of relay DUMP furthermore opens its back contact 91 in the existing stick circuit for relays STES and 4WCPS of FIG. 1A, thereby causing both of these relays to drop away. Consequently, the timer TIM of FIG. 1D is reset by the closing of back contact 95 of relay 4WCPS so that the associated timing relay TIR is now also dropped away, and timer TIM is furthermore rendered ineffective to cause subsequent energization of the relay TIR due to the opening of front contact 98 of relay DDP, which occurs as soon as the dumper WD is operated from its normal position, as previously described. In addition, even though the relay DDTES also drops away to open its front contact 121, the spotting registration provided by the relays OCZN, N5CZ etc. of FIG. 1D is maintained over front contact 122 of track relay CTR.

As mentioned above, as soon as the dumper WD returns to its normal position after dumping the first car of the automated train, the START and STOP relays of FIG. 1B are picked up to again cause a proceed command to be applied to the wayside loop circuit LP of FIGS. 1A and 1B. More specifically, during the predetermined time interval wherein relay DDP is picked up, but, relay DDTE has not as yet opened its back contact 34, the relay STOP is provided with momentary pick up circuit including back contact 36 of timing relay TIR (see FIG. 1B), wire 35 between FIGS. 1B and 1A, back contact 34 of relay DDTE, back contact 168 of relay DDTES, front contact 169 of relay DDP, back contact 170 of relay BTR, front contact 171 of relay CTR, and back contacts 172 and 173 of relays DTR and ETR respectively; whereas, relay START is also picked up by the energy on wire 35, over front contact 46 of relay ADC, back contact 47 of relay MDC, back contact 48 of relay DUMP, and front contact 49 of relay STOP. Thus, with the relays STOP and START once again picked up, transmitter TX of FIG. 1C supplies the carrier frequency, modulated by tones T5 and T6 simultaneously, to the wayside loop circuit LP, and the automated train ADT is again controlled to move at normal low speed to the left in FIGS. 1A and 1B so as to bring the second dumper car of the automated train towards the spotting location at wayside dumper WD and wayside hopper WH. As previously mentioned, after the relays STOP and START are picked up, they are maintained in their picked up positions, even though relay DDTE in FIG. 1A subsequently picks up.

However, as soon as relay DDTE does pick up, it then completes an energizing circuit for relay DDTES extending through front contact 174 of relay DDTE, whereby relay DDTES is picked up (as illustrated) to open its back contact 167 which causes subsequent dropping of relay DDTE. As will be pointed out in detail hereinafter, after the car dumping operation is completed for each car the spotting registration provided for that car by relays OCZN, N5CZ, etc., of FIG. 1D is no longer needed. Thus, it is intended here that the automated train ADT will start in motion so as to drop track relay CTR before the relay DDTES becomes picked up, in order to properly cancel the existing registration of the spotting register relays OCZN, N5CZ, etc., of FIG. 1D. Therefore, front contact 122 of relay CTR, as seen in FIG. 1C, opens before relay DDTES closes its front contact 121 of the same figure, and thereby interrupts the stick circuit for whichever of the spotting register relays had previously been picked up.

The proceed command signal including tones T5 and T6 remains applied to the loop circuit LP until the wheel count apparatus of FIG. 1C detects that four wheels have passed the count treadle WCT of FIG. 1B. More specifically, when the first wheel of the second dumper car actuates wheel count treadle WCT, the odd wheel trigger relay OWT of FIG. 1C is momentarily picked up, as previously described, to cause the first wheel count relay 1WC to then be picked up by a circuit including front contact 69 of relay OWT, back contact 70 of relay EWT, back contact 175 of relay 2WC, front contact 176 of relay 4WC (which had been picked up when the last wheel of the first dumper car actuated treadle WCT), and back contact 177 of relay 3WC. This picking up of relay 1WC then opens its back contact 83 and causes subsequent dropping away of relay 4WC.

Subsequently, when the second wheel of the second car actuates wheel counter treadle WCT, the even wheel trigger relay EWT is momentarily picked up and causes the second wheel count relay 2WC to be momentarily energized by a circuit including back contact 69 of relay OWT, front contact 81 of relay EWT, front contact 178 of relay 1WC, and back contacts 179 and 180 of relays 4WC and 3WC respectively. In substantially the same manner, as the third and fourth wheels of the second dumper car actuates the wheel count treadle WCT, the wheel counting relays 3WC and 4WC of FIG. 1C are successively picked up. Furthermore, when the fourth wheel count relay 4WC initially picks up, a circuit is then momentarily closed (relay 3WC is slow-releasing) for picking up repeater relay 4WCPS which sets the timer TIM into operation, as previously discussed, for timing out the interval determined by the setting of resistor SSR of FIG. 1C; at the end of which the relay TIR is picked up and removes the proceed command signal from the wayside loop circuit LP, so as to initiate stopping of the train.

Figure 4B:
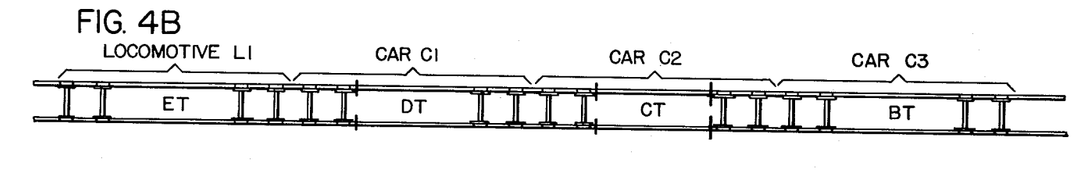
Figure 4C:
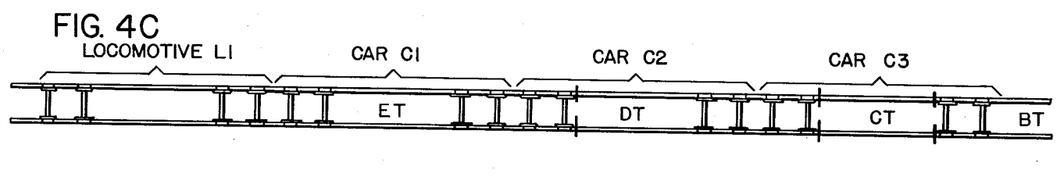
Figure 5:
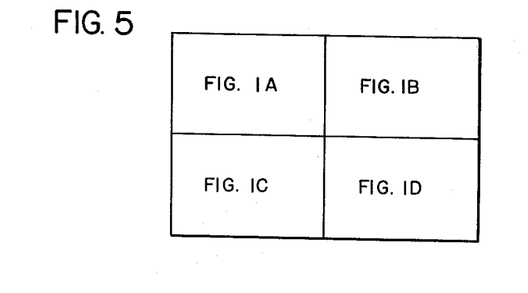
FIG. 5 is an arrangement diagram showing the proper arrangement of FIGS. 1A through 1D.

In substantially the same manner as previously described during control of the first car, the relays STE and STES of FIG. 1A are subsequently picked up, at which time the second dump car is respotted, if necessary, to position this car properly at the wayside dumper WD (as shown in FIG. 4B). Once the second dumper car is properly spotted, the relay DUMP is picked up and operates the wayside dumper WD, as previously mentioned. After this second car has been dumped and the wayside dumper WD has returned to normal position, the automated dump train ADT is again moved from right to left, as viewed in FIGS. 1A and 1B of the accompanying drawings, at its nominal low speed so as to bring the third dump car of the train into dumping position (see FIG. 4C).

ADJUSTMENT OF STOPPING PATTERN

As previously pointed out, the timing interval provided by the timer TIM and timing relay TIR of FIG. 1D determines how long, after the fourth wheel of a car passes a wheel count treadle MCT, that the proceed command signal made up of tones T5 and T6 is removed from the wayside loop circuit LP and the automated train consequently brought to a stop at or near the desired spotting location. During the preceding discussions, it has furthermore been pointed out that this timing interval is selected by the setting of adjustable resistor SSR of FIG. 1C which, in turn, is controlled by the up and down-step relays US and DS respectively, included in the stepper switch SS. More particularly, the stepper switch SS is assumed here to be that type, well-known in the prior art, wherein the movable arm 181 is moved one step in the clockwise direction each time relay US is energized, and, moved one step in the counter clockwise direction each time relay DS is energized; it furthermore being required that the relay US or DS be deenergized, after each energization, before more than one step can be taken in the associated direction. Thus, the arm 181 is moved one step, in either the clockwise or counterclockwise direction, for each time that the relay US or DS respectively, is pulsed.

It has furthermore been pointed out that it is necessary to adjust the stopping pattern for the automated dump train as each successive car is being spotted at the desired spotting location, to account for changes in the stopping distance for the train as brought about by changing weather conditions, changes in train load, etc., so that the actual stopping location for each car does not gradually fall out of alignment with the desired stopping location. Thus, the spotting register relays OCZN, N5CZ, C5CZ, etc., of FIG. 1D are utilized to detect the actual stopping position of each car relative to the desired spotting position, and furthermore, are utilized to properly adjust the setting of resistor SSR so that, for example, if one car stops too short of the desired spotting location, the stopping pattern for the train will be adjusted so as to permit the next car of the train to travel somewhat further before stopping, than the preceding car, thereby preventing the second car from also stopping too short of the desired location.

More particularly, if the relay OCZN is picked up, during the initial stopping of the train as previously discussed, to register that the dump car being spotted has stopped too short of its desired spotting location (while still occupying track setion CT), it is necessary to increase the timing interval for timer TIM by actuating the up-step relay US of FIG. 1C which drives the movable arm associated with resistor SSR in a clockwise direction along resistor SSR one step for each time the up-step relay US is pulsed.

More specifically, when the relay OCZN is first picked up, an energizing circuit is then completed for the relay US extending through back contact 182 of relay DUMP (see FIG. 1D), front contact 183 of relay OCZN, back contacts 184 and 185 of relays P5CZ and OCZP respectively, and along wire 186 between FIGS. 1D and 1C. This energization of the relay US then causes the movable arm 181 to be driven one step in the clockwise direction, which consequently increases the effective value of resistor SSR appearing between wires 96 and 97 in FIG. 1C and thereby also increases, by a predetermined amount, the time required for the timer TIM in picking up the associated relay TIR. Similarly, when the relay DUMP is first picked up to operate the wayside dumper WD, a second pulsing of the up-step relay US occurs over front contact 182 of relay DUMP, front contact 187 of relay OCZN, back contacts 184 and 185 of relays P5CZ and OCZP respectively, and along wire 186 between FIGS. 1C and 1D, so that the arm 181 of stepper switch SS is moved clockwise for a second step. Subsequently, when the relay DUMP is dropped away at the end of the car dumping operation, the up-step relay US is pulsed for a third time, again over back contact 182 of the relay DUMP.

Thus, it is seen that if a car stops too short, the picking up of relay OCZN causes movable arm 181 to be moved three steps in the clockwise direction on adjustable resistor SSR for correspondingly increasing the time interval of timer TIM, and therefore, the length of time for which the proceed command signal (tones T5 and T6) is maintained on wayside loop circuit LP, after the fourth wheel of the next car to be dumped passes wheel count treadle WCT. This obviously permits the next car to travel somewhat further than the preceding car for the purpose of preventing this subsequent car from also stopping short of the desired stopping location.

However, if relay N6CZ should be picked up to indicate that a car has been stopped only a little short of its optimum spotting position (still spanning track section CT), the movable arm 181 is moved two clockwise steps around resistor SSR to cause a somewhat lesser increase in the timing of timer TIM than occurs if relay OCZN picks up, as discussed above. More specifically, if relay N5CZ is picked up, a first pulsing of up-step relay US occurs over a circuit including back contact 188 of relay DUMP, front contact 189 of relay N5CZ, back contacts 184 and 185 of relays P5CZ and OCZP respectively, and wire 186 between FIGS. 1C and 1D. Subsequently, after the relay DUMP is operated, as previously discussed, it is returned to its normal dropped away position at the end of the dumping operation and its back contact 188 is again closed to cause a second pulsing of the up-step relay US over the same circuit. In this manner, the picking up of relay N5CZ causes movable arm 181 to be moved by two positions in the clockwise direction around resistor SSR, for increasing the time interval provided by timer TIM and relay TIR by the corresponding amount.

Similarly, if the relay C5CZ is picked up to indicate that the car has stopped in the optimum spotting position (spanning track section CT while having actuated only spotting treadle ST1), the up-step relay US is pulsed only once during the dumping operation, by a circuit including front contact 190 of relay DUMP and front contact 191 of relay C5CZ, so that the movable arm 181 is moved by one step in the clockwise direction on adjustable resistor SSR. As previously mentioned, this one step increase in the timing interval for timer TIM is provided to account for the fact that the actual train stopping distance decreases as each car of the train is emptied.

If the relay P5CZ becomes picked up, during initial stopping of the automated dump train, to register that the car being stopped has slightly overrun the optimum spotting position (but, has stopped while still spanning track section CT so that it may be dumped), the settting of adjustable resistor SSR is not altered; i.e., no pulsing of the up and down-step relays US or DS takes place, since back contacts 184 and 192 of relay P5CZ are opened at this time. As previously mentioned, the picking up of relay P5CZ produces no change in the setting of resistor SSR, since the stopping distance for the automated train when spotting the next car will naturally be somewhat less than that which is required during spotting of the preceding car owing to the decrease in train load caused by the dumping of this preceding car which stopped slightly past the optimum spotting position.

However, if the car to be dumped should excessively overrun the desired stopping location so that it again shunts track section CT and causes pick up of relay OCZP of FIG. 1D, as previously discussed, the down-step relay DS of FIG. 1C is energized over a circuit including front contact 190 of relay DUMP, back contact 192 of relay P5CZ, front contact 193 of relay OCZP and along wire 194 between FIGS. 1D and 1C. This energization of the down-step relay DS then causes movable arm 181 to be driven one step in the counterclockwise direction along resistor SSR, for the purpose of decreasing the time interval for timer TIM, by the amount proper to have the next car stop somewhat sooner than did this car which overran.

From the above discussion, it is thus seen that the stopping pattern for the automated dump train ADT is accurately controlled as each successive car of the train is being stopped for dumping, whereby the actual stopping location of each car automatically adjusts the stopping pattern for the subsequent car, to take into account the changes in stopping distance required by the train as brought about by changes in weather conditions, changes in train load, etc.

With reference to FIG. 1C, the up-step relay US is also provided with a so-called "homing" circuit arrangement whereby the movable arm 181 is automatically repositioned to the setting illustrated in FIG. 1C after all of the cars in a train have been properly dumped. More specifically, after the last car of the train has been dumped and the empty train subsequently moved off of the track sections BT and CT in FIG. 1B, the up-step relay US is then provided with an energizing circuit including front contacts 195 and 196 of track relays BTR and CTR respectively, movable arm 197 of the stepper switch SS, and back contact 198 of relay US; whereby the relay US is repeatedly pulsed until the stepper switch is brought into the illustrated position wherein movable arm 197 is in alignment with the open contact 199, at which time the up-step relay US is deenergized.

*Manual operation*

In addition to the previously discussed automatic dumping and spotting of each successive car on the automated dump train ADT, provisions are also made in accordance with the present invention whereby an operator at the dumping location may convert the system into condition wherein he manually controls application of the train control signals to the wayside loop circuit LP and the operation of the wayside dumper WD by actuating certain push buttons located, for example, in a dumping control office.

More specifically, in order to place the illustrated control system into manual operating condition, the operator moves the automation lever A–M in FIG. 1B to its right-hand or MAN position. This movement of the lever A–M opens its contacts 17 and 24 and thereby causes relays ADC and FPBP to be dropped away if the control system had previously been in automatic operating condition. Furthermore, this movement of the lever A–M causes relay MDC to be energized by a circuit including contact 200 of the lever A–M and back contact 26 of relay ADC. With the relay MDC now picked up, the relays FPBP and RPBP are controlled in accordance with actuation of the forward and reverse push buttons FPB and RPB respectively of FIG. 1B; i.e., if the push button FPB is depressed, the relay FPBP is energized over front contact 201 of relay MDC and back contact 18 of relay RPBP; whereas, if the push button RPB is depressed, the relay RPBP is picked up over front contact 202 of relay MDC and back contact 203 of relay FPBP.

With reference to FIG. 1B, the closure of either front contact 204 or front contact 205 of relays FPBP and RPBP respectively, causes the relay STOP to be energized, over front contacts 38 and 39 of relays MDC and CDUP respectively, and back contact 40 of relay DUMP, to connect the carrier oscillator COSC to the wayside transmitter TX. Subsequently, relay START is picked up over front contact 47 of relay MDC, back contact 48 of relay DUMP, and front contact 49 of relay STOP, to selectively connect the output tones of generators T4G, T5G, and T6G to the transmitter TX depending upon the operation desired.

More specifically, if the relay FPBP is picked to call for forward travel of the train at nominal low speed, tone T5 is applied to the transmitter TX over front contact 52 of relay FPBP, front contact 54 of relay START, front contact 55 of relay STOP, and back contact 56 of relay DUMP; whereas, tone T6 is simultaneously applied over front contact 53 of relay FPBP, and contacts 54, 55 and 56 of relays START, STOP and DUMP respectively. On the other hand, if relay RPBP is picked up to call for reverse travel at nominal low speed, the tones T4 and T5 are simultaneously applied to transmitter TX over front contacts 206 and 207 respectively of relay RPBP. In this matter, the dumping operator can cause the automated train ADT to travel in either a forward or reverse direction on the illustrated stretch of track at the nominal low train speed.

Furthermore, with the system in its manual operating condition (relay MDC picked up), the relay DUMP is then energized over a circuit including front contact 159 of relay MDC, in accordance with the actuation of the dumping push button DPB of FIG. 1B, so that the relay DUMP is picked up to operate the wayside dumper WD to its reverse or dumping position when the push button DPB is depressed. With reference to FIG. 1A, it should be noted that even during manual control, the contacts 151, 152, 153 and 154 of track relays ETR, DTR, CTR and BTR respectively still check that the car to be dumped is properly spotted (spanning track section CT) before the dumper WD can be operated.

In addition, during manual control of the dumping operation, the operator is permitted to test the wayside dumper WD, to see that it is in proper operating condition, by momentarily depressing dumper test push button DTPB of FIG. 1B which causes pick up of the relay DUMP over a circuit including front contact 159 of relay MDC and wire 208 in FIGS. 1B and 1A, provided that the track sections BTR, CTR and DTR are each unoccupied as detected by the closing of front contacts 209, 210 and 211 respectively, as seen in FIG. 1A.

Having thus described a vehicle control system as one specific embodiment of the present invention, it is desired to be understood that this form is selected to facilitate in the disclosure of the invention rather than to limit the number of forms which it may assume, and, it is to be further understood that various modifications, adaptations and alterations may be applied to the specific form shown to meet the requirements of practice without in any manner departing from the spirit or scope of the present invention.

What I claim is:

1. In a system for controlling a vehicle on a right of way including a desired stopping location for said vehicle, the combination of,
   (a) communication means partly on the wayside and partly on the vehicle for communicating selected control information from the wayside to the vehicle in the form of a carrier frequency distinctively modulated with predetermined tone frequencies in accordance with the desired vehicle operation on said right of way,
   (b) operating means on said vehicle responsive to said modulated carrier frequency effective to operate said vehicle as desired on said right of way,
   (c) stop control means responsive to the presence of said vehicle in approach of said desired stopping location effective to cause said carrier frequency to be modulated distinctive of a desired initial stopping of said vehicle, and
   (d) spotting control means responsive to the initial stopping of said vehicle effective to thereafter cause said communicated carrier frequency to be modulated selectively in accordance with the actual stopping location of said vehicle relative to said desired stopping location, whereby said vehicle is operated towards and stopped at said desired stopping location in the event said vehicle fails to stop initially at said desired stopping location.

2. The combination specified in claim 1 wherein said spotting control means are effective to cause said carrier frequency to be modulated with said tone frequencies indicative of a desired reverse movement by said vehicle if said vehicle initially stops beyond said desired stopping location, and, for causing said carrier frequency to be distinctively modulated with said tone frequencies indicative of a desired forward movement of said vehicle if said vehicle initially stops short of said desired stopping location.

3. In a system for accurately spotting a vehicle at a desired spotting location, said vehicle including self-contained braking apparatus, the combination of,
   (a) first proceed control means for causing said vehicle to approach said desired spotting location at a first predetermined speed,
   (b) first stopping control means responsive to the presence of said vehicle in approach of said desired spotting location effective to operate said braking apparatus to initiate a first stopping of said vehicle,
   (c) second proceed control means responsive to the first stopping of said vehicle and effective to cause said vehicle to thereafter approach said desired spotting location at a second predetermined speed lower than said first speed, said second speed being of a predetermined magnitude effective to permit said vehicle while travelling at such second speed to come to a standstill substantially at the same time a subsequent stopping of the vehicle is initiated,
   (d) second stopping control means effective to subsequently operate said braking apparatus to initiate a second stopping of said vehicle when said vehicle thereafter reaches said desired spotting location.

4. In a system for accurately spotting an automated vehicle at a desired spotting location on a right of way, said vehicle being operated in accordance with control information communicated from the wayside to the vehicle distinctive of the desired operation of said vehicle on said right of way, the combination of,
   (a) first proceed control means effective when said vehicle is to approach said desired spotting location for causing said communicated control information to be distinctive of a first predetermined desired vehicle speed,
   (b) first stopping control means responsive to the presence of said vehicle in approach of said desired spotting location effective to cause said communicated control information to then be distinctive of a desired initial stopping of said vehicle,
   (c) second proceed control means responsive to the initial stopping of said vehicle effective to cause said communicated control information to subsequently be distinctive of a second predetermined desired vehicle speed lower than said first predetermined desired vehicle speed, said second vehicle speed having a predetermined magnitude effective to permit the vehicle while travelling at such second speed to come to a standstill substantially at the same time that a subsequent stopping of said vehicle is desired, and (d) second stopping control means responsive to the arrival of said vehicle at said desired spotting location, while travelling at said second predetermined speed, for causing said communicated control information to be again distinctive of a desired stopping of said vehicle.

5. A system for successively spotting each object of a train of objects at a desired spotting location comprising, (a) operating means for moving said train of objects relative to said desired spotting location and for stopping said train of objects, said operating means including self-contained braking apparatus, (b) stopping control means effective to actuate said braking apparatus and cause said operating means to initiate a stopping of said train of objects as each successive object in said train of objects approaches said desired spotting location, (c) registering means responsive to the stopping of said train of objects effective to register the actual stopping location of each object relative to said desired spotting location, (d) spotting control means responsive to the registration of said registering means for each of said objects effective to cause said operating means to move and to subsequently actuate said braking apparatus and stop said train of objects as necessary to spot each object at said desired spotting location, in the event said object fails to initially stop at said desired location, and (e) means responsive to the spotting of each object at said desired spotting location effective to cause said operating means to move said train of objects for bringing the subsequent object in said train toward said desired spotting location.

6. A system for successively spotting cars of a railway train one after another at a predetermined spotting location on a right of way comprising, (a) communication means partly on the wayside and partly on said train effective to communication control information from the wayside to said train indicative of the desired train operation along said right of way, (b) proceed control means rendered effective when a first car of said train is to be spotted at said predetermined spotting location to cause said communication means to communicate a proceed control to said train, (c) detecting means responsive to the presence of said first car to be spotted in approach of said predetermined spotting location effective to cause said communication means to communicate an initial stop control to said train, (d) registering means responsive to the initial stopping of said first car to be spotted effective to register the actual stopping location of said first car relative to said predetermined spotting location, (e) spotting control means responsive to the registration of said registering means effective to cause said communication means to communicate proceed and stop controls to said train as necessary to spot said first car at said predetermined spotting location in the event said car fails to initially stop at said predetermined location, and (f) means responsive to the spotting of said first car at said predetermined spotting location for causing said communication means to communicate a proceed control to said train for bringing a second car to be spotted towards said predetermined spotting location.

7. The system specified in claim 6 wherein said railway train is equipped with throttle and brake mechanisms and a reverser mechanism for controlling the direction of travel of said train, and means responsive to the control information communicated from the wayside to said train by said communication means for operating said throttle, brake and reverser mechanisms as necessary to cause said train to be operated along said right of way as desired.

8. The system specified in claim 6 wherein communication means include, (a) a communication circuit disposes along said right of way, (b) a carrier frequency source, (c) a plurality of tone frequency sources, (d) means for modulating said carrier frequency with selected ones of said tone frequencies in accordance with the desired operation of said train along said right of way, (e) means for applying said modulated carrier frequency to said wayside communicating circuit, and (f) receiver means on said railway train effective to receive the modulated carrier frequency applied to said communicating circuit.

9. In a system for controlling the dumping of cars of a railway dump train at a predetermined wayside dumping location, the combination of, (a) communication means partly on the wayside and partly on said train for communicating control information from the wayside to the train indicative of desired operation of said train, (b) control means on said train responsive to said communicated information effective to operate said train as desired, (c) proceed control means rendered effective when a first car of said train is to be dumped for causing said communication means to communicate a proceed control to said train, (d) detecting means responsive to the presence of said first car in approach of said predetermined dumping location effective to cause said communication means to communicate an initial stopping control of said train, (e) registration means repsonsive to the initial stopping of said first car effective to register the actual stopping position of said first car relative to said predetermined dumping location, (f) spotting control means responsive to the registration of said registering means effective to cause said communications means to communicate proceed and stop controls to said train as necessary to spot said first car at said predetermined dumping location in the event said car fails to initially stop at said dumping location, (g) means rendered effective only after said first car has been spotted at said predetermined dumping location for dumping said first car, and (h) means responsive to the dumping of said first car for causing said communication means to communicate proceed control to said train for bringing the second car to be dumped toward said predetermined dumping location.

10. In a system for controlling the stopping of vehicles one after another at a desired stopping location, the combination of, (a) means responsive to the stopping of a first vehicle effective to register deviation of the actual stopping location of said first vehicle relative to said desired stopping location, and (b) means responsive to the registration of said registering means effective to select a stopping pattern for a subsequent vehicle.

11. In a system for controlling the stopping of vehicles one after another at a desired stopping location, the combination of, (a) means responsive to the presence of each vehicle in approach of said desired stopping location for initiating a stopping of said vehicle in accordance with a selected stopping pattern, (b) means responsive to the stopping of said vehicle effective to register deviation of the actual stopping location of said vehicle relative to said desired stopping location, and (c) means responsive to the registration of said registering means effective to vary the stopping pattern for a subsequent vehicle.

12. The combination specified in claim 11 wherein the amount of variation made in the stopping pattern for said subsequent vehicle is dependent upon the amount of deviation between the actual and desired vehicle stopping locations as registered by said registering means.

13. In a system for controlling the stopping of successive vehicles on a right of way, the combination of, (a) means responsive to the passage of a first vehicle at a selected stop initiation point along said right of way for initiating a stopping of said first vehicle, and (b) means responsive to the actual stopping position of said first vehicle for adjusting said stop initiation point for a subsequent vehicle.

14. In a system for controlling the stopping of successive vehicles at a desired stopping location, the combination of, (a) means for detecting the passage of each vehicle at a predetermined location in approach of said desired stopping location, (b) timing means rendered effective in response to the detection by said detecting means to begin timing a predetermined time interval, (c) stop control means responsive to said timing means effective to initiate a stopping of said vehicle at the end of said time interval, (d) means responsive to the stopping of said vehicle for registering the actual stopping location of said vehicle relative to said desired stopping location, and (e) means responsive to the registration of said registering means effective to adjust the interval timed by said timing means for a subsequent vehicle.

15. The combination specified in claim 14 wherein said time interval adjusting means include a stepper switch selectively actuated in response to the registration made by said registering means to increase or decrease the interval timed by said timing means for a subsequent vehicle in accordance with whether said preceding vehicle short of or beyond said desired stopping location respectively.

16. In a system for controlling the stopping of successive vehicles at a desired stopping location, the combination of, (a) means for detecting the passage of each vehicle at a predetermined location in approach of said desired stopping location, (b) timing means rendered effective in response to the detection by said detecting means to begin timing a predetermined time interval, (c) stopping control means responsive to said timing more effective to initiate a stopping of said vehicle at the end of said time interval, (d) means responsive to the stopping of said vehicle for registering the actual stopping location of said vehicle relative to said desired stopping location, (e) means responsive to the registration of said registering means effective to cause said vehicle to operate as necessary to spot said vehicle at said desired stopping locating in the event said vehicle fails to initially stop at said desired stopping location, and (f) means further responsive to the registration of said registering means effective to adjust the interval timed by said timing means for a subsequent vehicle.

17. A system for controlling the dumping of cars on a dump train at a predetermined dumping location comprising, (a) means for detecting the passage of each car at a predetermined location in aprroach of said dumping location, (b) timing means rendered effective in response to the detection of said detecting means to begin timing a predetermined time interval, (c) stop control means responsive to said timing means effective to initiate a stopping of said dump train at the end of said time interval, (d) means responsive to the stopping of said dump train for registering the actual stopping location of the first car to be dumped relative to said predetermined dumping location, (e) spotting control means responsive to the registration of said registering means effective to cause said train to be moved as necessary to spot said first car at said dumping location, (f) means rendered effective only after said first car has been spotted at said dumping location for dumping said first car, (g) means responsive to the registration of said registering means effective to adjust the interval timed by said timing means for the second car to be dumped, and (h) means rendered effective after each of said cars has been dumped for causing said train to be moved as necessary to bring the subsequent car to be dumped towards said predetermined dumping location.

18. The system according to claim 17 includes means rendered effective after all cars in said dump train have been dumped for adjusting said timing means to a predetermined condition.

19. The system according to claim 17 including communication means partly on the wayside and partly on the train for communicating control information from the wayside to the train indicative of the desired train operation, and means on the train responsive to said communicated control information effective to operate said train as desired.

20. In a system for spotting objects in a train of objects one after another at a desired spotting location, the combination of, (a) operating means for moving said train of objects relative to said desired spotting location and for stopping said train of objects, (b) stopping control means effective to cause said operating means to initiate a stopping of said train of objects as a first object to be spotted approaches said desired spotting location, (c) registering means responsive to the stopping of said train of objects effective to register the actual stopping location of said first object to be spotted relative to said desired spotting location, (d) spotting control means responsive to the registration provided by said registering means for said first object to be spotted and effective to cause said operating means to move and to subsequently stop said train of objects as necessary to spot said first object to be spotted at said desired spotting location, said spotting control means being rendered effective only in the event said first object stops on either side of said desired spotting location, and (e) means responsive to the spotting of said first object at said desired spotting location effective to cause said operating means to move said train of objects for bringing a subsequent object in said train towards said desired spotting location.

21. The combination specified in claim 20 wherein said stopping control means include, (a) means for detecting the passage of said first object at a predetermined location in approach of said spotting location, (b) timing means responsive to said detecting means rendered effective to begin timing out a selected timing interval when said first object passes said predetermined location, and
(c) means responsive to said timing means effective to cause said operating means to stop said train of objects at the completion of said timing interval.

22. In a system for controlling the stopping of a vehicle at a desired stopping location along a right of way, the combination of,
(a) means for detecting the passage of said vehicle at a predetermined location in approach of said desired stopping location,
(b) timing means responsive to said detecting means rendered effective to begin timing out a selected timing interval when said vehicle passes said predetermined location, and
(c) means responsive to said timing means effective to initiate a stopping of said vehicle at the completion of said timing interval.

23. In a system for controlling the stopping of successive vehicles along a right of way, the combination of
(a) means for detecting the actual stopping location of a first vehicle relative to a desired stopping location for said first vehicle, and
(b) means responsive to said detecting means for adjusting the time at which a subsequent vehicle will begin stopping after passing a predetermined location in approach of a desired stopping location for said subsequent vehicle.

24. The combination specified in claim 23 wherein the desired stopping location for said subsequent vehicle is the same as the desired stopping location for said first vehicle.

25. In a system for controlling the stopping of successive vehicles on a right of way, the combination of,
(a) means for detecting the actual stopping location of a first vehicle relative to a desired stopping location for said first vehicle, and
(b) responsive to said detecting means for adjustably controlling occurrence of stop initiation of a subsequent vehicle.

References Cited by the Examiner

UNITED STATES PATENTS

| | | | |
|---|---|---|---|
| 1,544,988 | 7/25 | Hutton | 214—55 |
| 1,768,360 | 6/30 | Jenney. | |
| 2,288,763 | 7/42 | Winship et al. | 214—41 |
| 2,529,804 | 11/50 | Harnischfeger et al. | |
| 2,617,546 | 11/52 | Rosener | 214—44 |
| 2,659,498 | 11/53 | McCarthy | 214—42 |
| 2,863,398 | 12/58 | Granath | 104—162 |
| 3,100,098 | 8/63 | Crawford et al. | |

OTHER REFERENCES

Railway Signaling and Communications, pages 19–25, October 1962 (Simmons-Boardman, New York) (copy in Group 450).

HUGO O. SCHULZ, *Primary Examiner.*

GERALD M. FORLENZA, *Examiner.*